United States Patent [19]

Weinstein

[11] 4,289,791

[45] Sep. 15, 1981

[54] ICE CREAM CONE WITH JACKET ATTACHED AND METHOD FOR PRODUCING SAME

[75] Inventor: David Weinstein, Baltimore, Md.

[73] Assignee: Maryland Cup Corporation, Owings Mills, Md.

[21] Appl. No.: 36,227

[22] Filed: May 4, 1979

Related U.S. Application Data

[63] Continuation-in-part of Ser. No. 885,278, Mar. 10, 1978, and Ser. No. 910,886, May 30, 1978.

[51] Int. Cl.³ .................... B65G 59/00; A21D 13/00
[52] U.S. Cl. .................................. 426/139; 426/396; 426/410; 426/415
[58] Field of Search ............... 426/139, 101, 104, 130, 426/565–567, 396, 410, 415; 53/580, 583, 584; 222/1

[56] References Cited

U.S. PATENT DOCUMENTS

| | | | |
|---|---|---|---|
| 2,228,942 | 1/1941 | Balton | 426/139 |
| 2,557,602 | 6/1951 | Huitt et al. | 426/139 |
| 2,965,499 | 12/1960 | Wise | 426/139 |
| 3,170,568 | 2/1965 | Carter | 426/139 |
| 4,136,800 | 1/1979 | Christner et al. | 426/139 |

Primary Examiner—Jeanette M. Hunter
Attorney, Agent, or Firm—Birch, Stewart, Kolasch & Birch

[57] ABSTRACT

An ice cream cone product is provided having a sanitary paper jacket adhered thereto which is sufficiently adherent for shipping, handling and vending but which is selectively removable without leaving jacket remnants on the cone or cone remnants on the jacket. A jacket is telescopically juxtaposed over the cone after the jacket interior is applied with vaporized mixture of water and an adhesion-reducing agent. A conveyor for the cones, a timed dispenser and injector for placing the jackets alternately on the same conveyor with the cones, a device to combine each jacket with a cone and an accumulator for the jacketed cone product comprises the apparatus to practice the method.

15 Claims, 2 Drawing Figures

ICE CREAM CONE WITH JACKET ATTACHED AND METHOD FOR PRODUCING SAME

The present invention is a continuation-in-part of copending application Ser. No. 885,278, filed Mar. 10, 1978 and copending application Ser. No. 910,886, filed May 30, 1978.

FIELD OF THE INVENTION

This invention relates to baked ice cream cones and more particularly to such baked ice cream cones with a paper protective jacket attached thereto together with a method and apparatus for attaching the jacket to the said cone.

BACKGROUND OF THE INVENTION

When an ice cream cone is to be served by a vendor to a customer, by filling the ice cream cone with the customer's choice of ice cream or other frozen confections, the normal procedure is for the vendor to remove the cone from the shipping container in which the vendor received it and serve it to the customer either as is or with a piece of paper or napkin wrapped around the cone. In either case, the cone is subject to some direct contact by the vendor's personnel prior to serving which is, at best, marginally sanitary. Efforts in the industry have been made to alleviate this condition by having the vendor try to apply some form of protective wrap before taking the cone from the shipping box. This proves to be cumbersome, time-consuming and impractical, however, from the vendor's standpoint and accordingly, is not universally practiced.

Other attempts to apply wraps to baked ice cream cones at the point of manufacture, prior to packing the cone in the shipping box or carbon, resulted in the wraps coming loose during shipping or slipping off of the cone when the vendor attempted to dispense the cone from the package, therefore, returning the vendor to the previous condition, namely, providing a cumbersome, time-consuming and impractical effort to render the vending of ice cream cones more sanitary.

In other instances attempts to apply jackets to baked ice cream cones at the point of manufacture, prior to packing the cone in the shipping box or carton has resulted in the jacket being too strongly bonded to the cone so that when the jacket is removed from the cone prior to eating, considerable amounts of paper from the jacket would adhere to the cones or parts of the cone would stick to the paper jacket. For example 100% water has been utilized with the creation of such a strong bond between the jacket and the cone that separation of the jacket from the cone results in unacceptable jacket and cone tear.

Accordingly, it is an object of the present invention to provide a combination ice cream cone-in-jacket in which the jacket is sufficiently affixed to the cone such that the vendor will find it practical to leave the jacket on the cone during the vending operation and yet which will permit the consumer to readily separate the jacket from the cone at the point of purchase.

Another object of the present invention is to provide a new and novel method for applying a jacket to a baked ice cream cone such that the jacket will adhere to the cone sufficiently during packing, shipping, dispensing, and handling to preclude its accidental removal and yet which will be readily separable from the cone if such is intended by a consumer with substantially no jacket or cone tear.

Yet another object of the present invention is to provide an apparatus for placing a jacket on a cone in such a manner as to preclude its accidental removal therefrom.

These and other objects of the present invention will become more fully apparent with reference to the following specification and drawings which relate to a preferred embodiment of the present invention.

SUMMARY OF THE INVENTION

Pursuant to the present invention the above-identified disadvantages have been eliminated by interposing a mixture of water and an adhesion-reducing agent between the sanitary jacket and the ice cream cone and causing the sanitary jacket and the ice cream cone to be brought together in juxtaposition to secure the jacket to the cone. By diluting the water with an effective amount of an adhesion-reducing agent, the strong bond created by using 100% water is advantageously modified so that separation of the jacket from the cone can be achieved with substantially little or no jacket or cone tear.

The adhesion-reducing agent is a food grade, non-toxic, hydrophilic material which, when mixed with water provides a bond between the jacket and the cone which fulfills the objects of the present invention as set forth hereinabove.

Suitable adhesion-reducing agents include monohydric and polyhydric alcohols, natural sugar syrups, surfactants and mixtures thereof. The alcohols which can be used in the present invention include monohydric alcohols, e.g., ethyl alcohol, polyhydric alcohols, e.g., ethylene glycol, propylene glycol, glycerol, sorbitor, mannitol, polyethylene glycol, xylitol, and the like. Examples of natural sugar syrups include corn syrup, honey, etc. Typical surfactants include polyoxyethylene derivatives of fatty acid partial esters of sorbitol, anhydrides, e.g., TWEEN 80 and fatty acid partial esters of sorbitol anhydrides, e.g., SPAN 60.

The amount of the adhesion-reducing agent present in the mixture will, of course, vary depending upon the particular constituent which is mixed with the water. It can be generally stated that the adhesion-reducing agent is present in the mixture in an amount sufficient to achieve a bond which holds the jacket to the cones during normal handling while at the same time permitting separation of the jacket from the cone with no jacket or cone tear, that is, with substantially no visible jacket paper remaining on the cone or with substantially no visible cone pieces remaining on the jacket after the jacket has been removed.

When a polyhydric alcohol, for example, propylene glycol, is mixed with water, a good bond with minimal fiber tear is achieved when propylene glycol is present in an amount of about 85±1 vol. % and the water is present in an amount of about 15±1 vol. %. When glycerol is mixed with water a good bond is achieved with only a trace of fiber tear when the glycerol is present in an amount of about 70 to 90 volume % and the water is present in an amount of about 10 to 30 volume %. When ethyl alcohol is mixed with water a good bond is achieved with either no fiber tear or acceptable fiber tear when the ethyl alcohol is present in an amount of about 55 to 60 volume % and water is present in an amount of 40 to 45 volume %.

Natural sugar syrups, for example honey, achieves a good bond with only a small amount of fiber tear when the honey is present in an amount of 75 volume % and the water is present in an amount of about 25 volume %.

When a surfactant, e.g., TWEEN 80 is mixed with water, a good bond with acceptable fiber tear is achieved when the TWEEN 80 is present in an amount of about 15 volume % and water is present in an amount of about 85 volume %.

Advantageously, the mixture of water and the adhesion-reducing agent is applied to the interior surface of the jacket and in the form of a vapor and then the ice cream cone is inserted into the jacket into juxtaposition therewith while the vapor remains on the internal surface of the jacket. Alternatively, the vapor could be applied to the exterior surface of the cone or to both surfaces of the jacket and the cone before they are brought into said juxtaposition relationship. Although application in the form of a vapor is preferred, any method of applying the mixture between the surfaces of the jacket and the cone can be utilized which is effective in achieving the desired bonding effect.

In the method of the present invention, a plurality of ice cream cones from a conventional ice cream cone baker or other production device are provided in spaced-apart continuous motion along a conveyor which is coordinated with the dispensing of a plurality of nested frusto-conical jackets having a shape which conforms to the exterior of the ice cream cones. The jackets are dispensed one at a time on the same conveyor as the ice cream cones, intermediate adjacent cones and subsequently passed through a nesting device such that a cone in jacket will be caused to nest together, with the jacket proceeding the cone receiving the trailing cone and subsequently the nested cones in their respective jackets will themselves be fully nested and ultimately placed into a shipping container or the like. During the dispensing operation of the nested jackets in synchronism with the spacedapart cones on the conveyor, the nested jackets pass from a primary jacket dispenser into a secondary jacket dispenser where they are momentarily held and subjected to an internal application of a vaporized mixture of water and an adhesion-reducing agent. Subsequent to this application, each jacket is dispensed through a chute which directs it onto the cone conveyor at a position intermediate a pair of cones. Thus, the jacket is in position to receive a trailing ice cream cone and because of its premoistened condition, will adhere to the cone sufficiently to preclude accidental removal during packing, shipping and dispensing and yet will be readily removable by a customer at the point of purchase. The ice cream cones can be made of any desired ingredients, e.g. can be either sugar cones or cake cones and the jackets are usually made of paper which can be wax coated.

The method of the present invention was conducted utilizing various mixtures of water and an adhesion-reducing agent with the following results.

EXAMPLE 1

Using the general method discussed hereinabove the bonding effect of cone jackets to ice cream cones was tested for various solutions of propylene glycol and water with the following results:

| Test No. | Propylene Glycol (Vol %) | Water (Vol %) | Results |
|---|---|---|---|
| 1 | 100 | 0 | Rejected - too many jackets not bonded |
| 2 | 90 | 10 | Rejected - too many jackets not bonded |
| 3 | 85 | 15 | Accepted - good bond, minimal fiber tear |
| 4 | 80 | 20 | Rejected - objectionable fiber tear |
| 5 | 75 | 25 | Rejected - objectionable fiber tear |
| 6 | 50 | 50 | Rejected - objectionable fiber tear |

The above test data suggest that the deviation in preparing the above mixture should preferably be not greater than ±1% for either the water or propylene glycol.

EXAMPLE 2

Using the general method set forth in the specification, the bonding effect of cone jackets to ice cream cones was tested for various solutions of glycerol and water with the following results:

| Test No. | Glycerol (Vol %) | Water (Vol %) | Results |
|---|---|---|---|
| 1 | 10 | 90 | Good bond, objectionable fiber tear |
| 2 | 20 | 80 | Good bond, objectionable fiber tear |
| 3 | 25 | 75 | Good bond, objectionable fiber tear |
| 4 | 35 | 65 | Good bond, objectionable fiber tear |
| 5 | 50 | 50 | Good bond, objectionable fiber tear |
| 6 | 70 | 30 | Good bond, trace fiber tear |
| 7 | 75 | 25 | Good bond, trace fiber tear |
| 8 | 85 | 15 | Good bond, trace fiber tear |
| 9 | 90 | 10 | Good bond, erratic fiber tear-objectionable |

A good bond with only a trace of fiber tear was achieved with 70 to 90 vol. % glycerol and 10 to 30 vol. % water.

EXAMPLE 3

Using the general method set forth in the specification, the bonding effect of cone jackets to ice cream cones was tested for various solutions of honey and water with the following results:

| Test No. | Honey (Vol %) | Water (Vol %) | Results |
|---|---|---|---|
| 1 | 25 | 75 | Good bond, objectionable fiber tear |
| 2 | 50 | 50 | Good bond, objectionable fiber tear |
| 3 | 60 | 40 | Good bond, objectionable fiber tear |
| 4 | 65 | 35 | Good bond, objectionable fiber tear |
| 5 | 70 | 30 | Good bond, objectionable fiber tear |
| 6 | 75 | 25 | Good bond, small amount of fiber tear |

A mixture of 75 vol. % honey and 25 vol. % water was found to provide a good bond with only a small amount of fiber tear. However, the sticky nature of honey made handling difficult. For example the area at the spray unit tended to become coated, making everything sticky, including the conveyor belt. Also, a longer setting or bonding time was required due to the tackiness of the honey.

EXAMPLE 4

Using the general method as set forth in the specification, the bonding effect of cone jackets to uncoated sugar cones was tested for corn syrup by itself or mixtures of corn syrup with glycerine and/or water with the following results:

| Test No. | Corn Syrup (Vol %) | Water (Vol %) | Glycerol (Vol %) | Results |
| --- | --- | --- | --- | --- |
| 1 | 100 | 0 | 0 | Good bond, objectionable fiber tear |
| 2 | 90 | 10 | 0 | Good bond, objectionable fiber tear |
| 3 | 85 | 15 | 0 | Good bond, objectionable fiber tear |
| 4 | 25 | 73 | 2 | Good bond, objectionable fiber tear |
| 5 | 85 | 13 | 2 | Good bond, objectionable fiber tear |

Corn syrup and mixtures thereof with glycerol and/or water did achieve a good bond between the jacket and the cone but they did not appear to be as desirable as other constituents since objectionable fiber tear was noted.

EXAMPLE 5

Using the general method set forth in the specification, the bonding of cone jackets to cones was tested for various combinations of the surfactants SPAN 60 and TWEEN 80, from 0.33 to 2.0 vol. %, in water with undesirable results. However, TWEEN 80 mixed with water and glycerol did show advantageous results.

| Test No. | TWEEN 80 | Water | Glycerol | Results |
| --- | --- | --- | --- | --- |
| 1 | 5 vol % | 95 vol % | | Good bond - Objectionable fiber tear |
| 2 | 15 vol % | 85 vol % | | Good bond - Acceptable fiber tear |
| 3 | 4.8 wt % | 23.8 wt % | 71.4 wt % | Good bond - Acceptable fiber tear |
| 4 | 13.64 wt % | 77.27 wt % | 9.09 wt % | Good bond - Acceptable fiber tear |

Mixtures 2, 3 and 4 showed a good bond with acceptable fiber tear.

EXAMPLE 6

Using the general method set forth in the specification, the bonding of cone jackets to cones was tested for a mixture of ethyl alcohol and water with the following results:

| Test No. | Ethyl Alcohol (Vol %) | Water (Vol %) | Results |
| --- | --- | --- | --- |
| 1 | 50 | 50 | Good bond, objectionable fiber tear |
| 2 | 55 | 45 | Good bond, acceptable fiber tear |
| 3 | 60 | 40 | Good bond, no fiber tear |
| 4 | 65 | 35 | Erratic bond, unacceptable |
| 5 | 85 | 15 | No bond |

Any mixture of ethyl alcohol and water, with a water constant greater than 50% would bond the jackets but were unacceptable because of the amount of fiber tear.

BRIEF DESCRIPTION OF THE DRAWINGS

FIG. 1 is a combined cross-sectional view and enlarged partial detail of a baked conical ice cream cone nested in a conical paper jacket or the like.

DETAILED DESCRIPTION OF THE DRAWINGS

Figure 1:
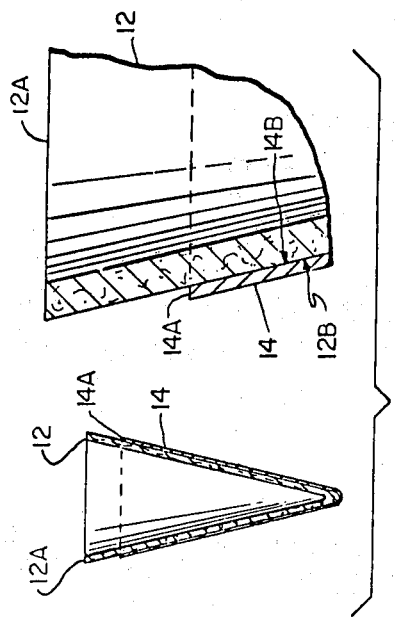
Figure 2:
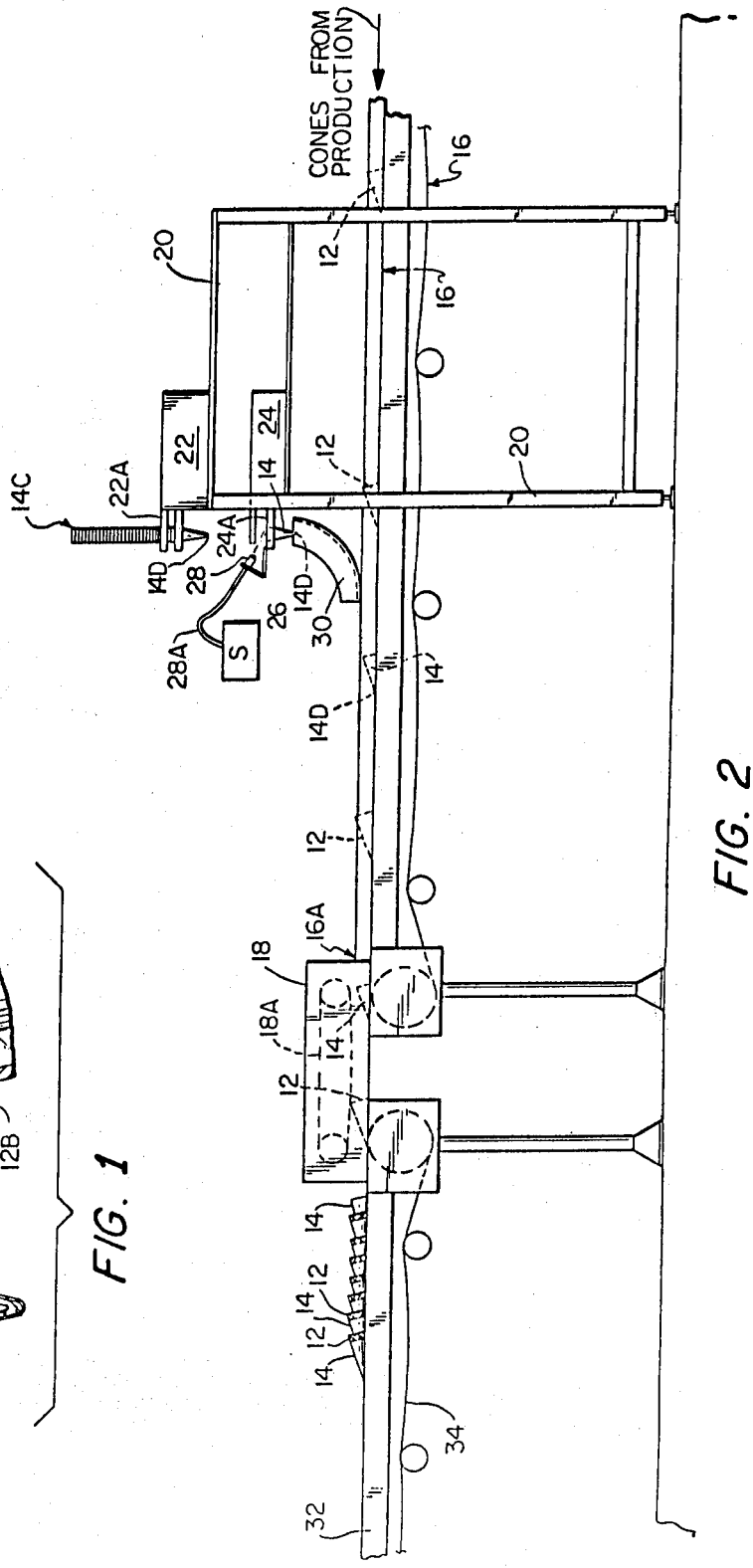
FIG. 2 is a schematic of a method in production line apparatus for the production of the jacketed ice cream cone of FIG. 1.

Referring in detail to the drawings with particular reference to FIGS. 1 and 2, an ice cream cone 12 of the present invention is shown as being conical in shape and is constituted of baked cookie dough or the like as is conventional in the art. A conical paper jacket 14 is superimposed or telescoped over the closed apex of the ice cream cone 12 and extends to an uppermost edge 14A which terminates somewhat below the top 12A of the ice cream cone 12. This leaves the uppermost portion of the ice cream cone 12 exposed for display purposes and prevents contact of the ice cream dip and the jacket for easy removal by the customer, without leaving enough exposed to be contacted by the hand of the vendor at the point of purchase by the consumer.

The paper jacket 14 is caused to adhere to the external surface 12B of the ice cream cone 12 in an amount sufficient to preclude its casual or accidental removal therefrom but no so tight as to cause remnants thereof from remaining on the ice cream cone 12 in the event that the consumer deliberately attempts to remove the protective jacket.

This selective adherence is made possible by applying a dosage of a vaporized mixture of water and an adhesion-reducing agent, e.g., propylene glycol from a nozzle into the interior of the paper jacket 14. A short duration burst of said mixture has been found to provide sufficient interaction between the internal surface 14B of the paper jacket 14 and the external surface 12B of the ice cream cone 12 to cause the necessary adherence therebetween to achieve the desired result.

Referring now to FIG. 2, the ice cream cones 12 are shown as being in spaced apart relationship on a conveyor belt 16 or the like and proceed from right to left in the drawing as shown while maintaining their space apart relationship over a reach of the conveyor extending from a production point for the cones (not shown) to a point 16A immediately upstream of the entrance to a nesting device 18 which is schematically shown at the end of the conveyor 16. Upstream of the nesting device 18 is a machine stand 20 which extends above the conveyor 16 to support a primary jacket dispenser 22 at the uppermost portion thereof and a secondary jacket dispenser 24 located vertically beneath the primary jacket dispenser 22 on the frame 20.

The primary jacket dispenser 22 has an outboard dispensing mechanism 22A which cooperates with the stock 14C of nested jackets 14 such that the apex 14D of each of the jackets is pointed downwardly and the dispensing mechanism 22A is any suitable type which will dispense one conical jacket at a time from the stack 14C and permit it to fall by gravity with the point 14D downwardly into a receiving bracket and further dispensing mechanism 24A in the secondary jacket dispenser 24. An additional bracket 26 is provided adjacent the dispensing mechanism 24A on the secondary jacket dispenser 24 for supporting a nozzle 28 in close proximity to the open paper jacket 14 being held by the secondary dispensing bracket 24A in order that a jet of a vaporized mixture comprised of water and an adhesion reducing agent may be injected into the open upper end of the jacket 14 to thereby selectively moisten the interior thereof. The nozzle 28 is connected through a steam line or other fluid hose connection 28A to a source S of the aforesaid mixture.

Immediately beneath the secondary dispensing bracket 24A is an orientation chute 30 which receives and dispenses a premoistened jacket 14 from the secondary dispensing bracket 24A of the secondary jacket dispenser 24 and directs it from a vertical position into a horizontal position between two of the cones 12 on the conveyor 16 with the apex 14D in the leading direction such that the attitude of the jacket 14 on the conveyor 16 is identical with the attitudes of the cones 12 on the same conveyor.

The jacket 14 leads the cone 12 through the nesting device 18 which includes suitable driving rods 18A and the like to drive cone 12 into a waiting moistened jacket 14 on packing table belt 34 at the indicated siamese point. From the packing table 32, the combined nested cone-in-jacket combinations 12 and 14 are selectively dispensed or conveyed into suitable packing crates and the like, not shown.

In the foregoing description of the invention it is to be understood that the term paper jacket is merely an exemplary one and is in no way intended to preclude the use of foil or other suitable wrapping materials such as plastics and laminates. The jacket itself can be any suitable configuration which conforms sufficiently to the surface of the cone to adhere thereto and can be wrapped thereon as well as preformed.

The fact that the jackets of the present invention will adhere to the cones in a manner in which they do provide a new and desirable advertising medium which is of great importance in any commercial product.

Additionally, it is significant that prior to the present invention, it has been the practice to bar all liquids from the packaging area where baked cones and the like are put in the jackets since until the present invention, the moisture was found to bind the jacket to the cone so securely that they could not be easily or completely separated. Parts of the jacket would become permanently attached to the cone and render the product at the consumer level undesirable.

The preferred dosage of the vaporized mixture of about 15% water and about 85% propylene glycol has been found to be about a volume equivalent to 60 milligrams at room temperature for such vapor with a particle size of 1 micron.

From the foregoing description and drawings, it can be readily seen that the present invention provides a uniquely simple and straightforward method and apparatus for effecting the desired end result, namely, a combined baked ice cream cone and protective sanitary jacket product which remain in a unitary construction with sufficient strength to withstand handling and dispensing at the customer's point of purchase and yet still provide for the consumer to readily remove the sanitary jacket from the cone without defacing the cone such as by leaving remnants thereof on the cone at the point of purchase and consumption thereof.

It should be understood that the ice cream cone with jacket attached and method and apparatus for producing the same of the present invention may be modified as would occur to one of ordinary skill in the art without departing from the spirit and scope of the present invention.

I claim:
1. A method of adhering a sanitary jacket to a conformally shaped ice cream cone comprising the steps of:
   interposing a mixture of water and an adhesion-reducing agent between said sanitary jacket and said ice cream cone;
   causing said sanitary jacket and said ice cream cone to be brought together in juxtaposition with said mixture of water and adhesion-reducing agent being dispersed therebetween; and
   drying the combined cone and sanitary jacket;
   said adhesion-reducing agent comprising a food grade, non-toxic and hydrophilic material selected from the group consisting of an alcohol, a natural sugar syrup, a surfactant, and mixtures thereof, which is mixed with water in an amount sufficient to cause said adhesion while at the same time permitting separation of the jacket from the cone with substantially no jacket or cone tear.

2. The method of claim 1, wherein the mixture of water and the adhesion-reducing agent is interposed between said sanitary jacket and said cone as a vapor.

3. The method of claims 1 and 2, wherein the mixture of water and an adhesion-reducing agent is interposed between said sanitary jacket and said cone by the application of said mixture to the internal surface of the sanitary jacket.

4. The method of claims 1 and 2, wherein the mixture of water and an adhesion-reducing agent is interposed between said sanitary jacket and said cone by the application of said mixture to the external surface of the cone.

5. The method of claims 1 and 2, wherein the mixture of water and an adhesion-reducing agent is interposed between said sanitary jacket and said cone by the application of said mixture to both the internal surface of the sanitary jacket and the external surface of the cone.

6. The method of claim 1, wherein the adhesion-reducing agent is propylene glycol which is mixed with the water to form a mixture of about 85 volume persent propylene glycol and about 15 volume percent water.

7. The method of claim 1, wherein the adhesion-reducing agent is glycerol which is mixed with the water to form a mixture of about 70 to 90 volume persent glycerol and about 10 to 30 volume percent water.

8. The method of claim 1, wherein the adhesion-reducing agent is ethyl alcohol which is mixed with the water to form a mixture of about 55 to 60 volume percent ethyl alcohol and about 40 to 45 volume percent water.

9. The method of claim 1, wherein the adhesion-reducing agent is honey which is mixed with the water to form a mixture of about 75 volume percent honey and about 15 volume percent water.

10. The method of claim 1, wherein the adhesion-reducing agent is a fatty acid partial ester of sorbitol anhydride which is mixed with the water to form a mixture of about 15 volume percent of the anhydride and about 85 volume percent water.

11. The method of claim 2, wherein the vapor is applied in doses of about 60 milligrams with a particle size of about one micron.

12. A method of adhering sanitary jackets onto each of a succession of cones of a conformal shape with said jackets comprising:

conveying a plurality of cones, apex first, along a conveyor at regularly spaced intervals;

storing a vertical stack of said paper jackets above said conveyor and the conveyed path of said cones;

dispensing said jackets one at a time from said stack to a work holding means and injecting a vaporized mixture of about 85% propylene glycol and about 15% water into the interior thereof;

dispensing said vapor injected jackets onto said conveyor intermediate said cones and at substantially equal spaced intervals with said cones; and inserting a trailing cone into and in position with a leading jacket while the latter is still moist from the vapor injection.

13. The method of claim 12, wherein the vapor is applied in doses of about 60 milligrams with a particle size of about one micron.

14. The product produced by the method of claim 1.

15. The product produced by the method of claim 12.

* * * * *

REEXAMINATION CERTIFICATE (425th)

United States Patent [19]

Weinstein

[11] B1 4,289,791

[45] Certificate Issued Nov. 19, 1985

[54] ICE CREAM CONE WITH JACKET ATTACHED AND METHOD FOR PRODUCING SAME

[75] Inventor: David Weinstein, Baltimore, Md.

[73] Assignee: Maryland Cup Corporation, Owings Mills, Md.

Reexamination Request:
No. 90/000,328, Feb. 16, 1983

Reexamination Certificate for:
Patent No.: 4,289,791
Issued: Sep. 15, 1981
Appl. No.: 36,227
Filed: May 4, 1979

Related U.S. Application Data

[63] Continuation-in-part of Ser. No. 885,278, Mar. 10, 1978, and Ser. No. 910,886, May 30, 1978.

[51] Int. Cl.[4] .................. B65G 59/00; A21D 13/00
[52] U.S. Cl. ................................ 426/139; 426/396; 426/410; 426/415
[58] Field of Search ............... 426/139, 396, 410, 415, 426/101, 104, 130, 565–567; 53/580, 583, 584; 222/1

[56] References Cited

U.S. PATENT DOCUMENTS 2,227,428  1/1941  Amberg et al. .
2,303,420  12/1942  Amberg et al. .

*Primary Examiner*—Jeanette M. Hunter

[57] ABSTRACT

An ice cream cone product is provided having a sanitary paper jacket adhered thereto which is sufficiently adherent for shipping, handling and vending but which is selectively removable without leaving jacket remnants on the cone or cone remnants on the jacket. A jacket is telescopically juxtaposed over the cone after the jacket interior is applied with vaporized mixture of water and an adhesion-reducing agent. A conveyor for the cones, a timed dispenser and injector for placing the jackets alternately on the same conveyor with the cones, a device to combine each jacket with a cone and an accumulator for the jacketed cone product comprises the apparatus to practice the method.

ବ1 4,289,791

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6-8, 10, 12, 13 and 15 is confirmed.

Claims 1-5 and 14 are cancelled.

Claims 9 and 11 are determined to be patentable as amended.

New claims 16-25 are added and determined to be patentable.

9. The method of claim 1, wherein the adhesion-reducing agent is honey which is mixed with the water to form a mixture of about 75 volume percent honey and about [15] *25* volume percent water.

11. The method of claim [2] *21*, wherein the vapor is applied in doses of about 60 milligrams with a particle size of about one micron.

*16. A method of adhering a sanitary jacket to a conformally shaped ice cream cone comprising the steps of:*

*interposing a mixture of water and an adhesion-reducing agent between said sanitary jacket and said ice cream cone;*

*causing said sanitary jacket and said ice cream cone to be brought together in juxtaposition with said mixture of water and adhesion-reducing agent being dispersed therebetween; and*

*drying the combined cone and sanitary jacket;*

*said adhesion-reducing agent comprising a food grade, non-toxic and hydrophilic material selected from the group consisting of an alcohol, a surfactant, and mixtures thereof, which is mixed with water in an amount sufficient to cause said adhesion while at the same time permitting separation of the jacket from the cone with substantially no jacket or cone tear.*

*17. The method of claim 16, wherein the mixture of water and the adhesion-reducing agent is interposed between said sanitary jacket and said cone as a vapor.*

*18. The method of claims 16 and 17, wherein the mixture of water and an adhesion-reducing agent is interposed between said sanitary jacket and said cone by the application of said mixture of the internal surface of the sanitary jacket.*

*19. The method of claims 16 and 17, wherein the mixture of water and an adhesion-reducing agent is interposed between said sanitary jacket and said cone by the application of said mixture of the external surface of the cone.*

*20. The method of claims 16 and 17, wherein the mixture of water and an adhesion-reducing agent is interposed between said sanitary jacket and said cone by the application of said mixture to both the internal surface of the sanitary jacket and the external surface of the cone.*

*21. A method of adhering a sanitary jacket to a conformally shaped ice cream cone comprising the steps of:*

*interposing a mixture of water and an adhesion-reducing agent, as a vapor, between said sanitary jacket and said ice cream cone;*

*causing said sanitary jacket and said ice cream cone to be brought together in juxtaposition with said mixture of water and adhesion-reducing agent being dispersed therebetween; and*

*drying the combined cone and sanitary jacket;*

*said adhesion-reducing agent comprising a food grade, non-toxic and hydrophilic material selected from the group consisting of an alcohol, a natural sugar syrup, a surfactant, and mixtures thereof, which is mixed with water in an amount sufficient to cause said adhesion while at the same time permitting separation of the jacket from the cone with substantially no jacket or cone tear.*

*22. The method of claim 21, wherein the mixture of water and an adhesion-reducing agent is interposed between said sanitary jacket and said cone by the application of said mixture to the internal surface of the sanitary jacket.*

*23. The method of claim 21, wherein the mixture of water and an adhesion-reducing agent is interposed between said sanitary jacket and said cone by the application of said mixture to the external surface of the cone.*

*24. The method of claim 21, wherein the mixture of water and an adhesion-reducing agent is interposed between said sanitary jacket and said cone by the application of said mixture to both the internal surface of the sanitary jacket and the external surface of the cone.*

*25. The product produced by the method of claim 16.*

* * * * *